Figure 1:
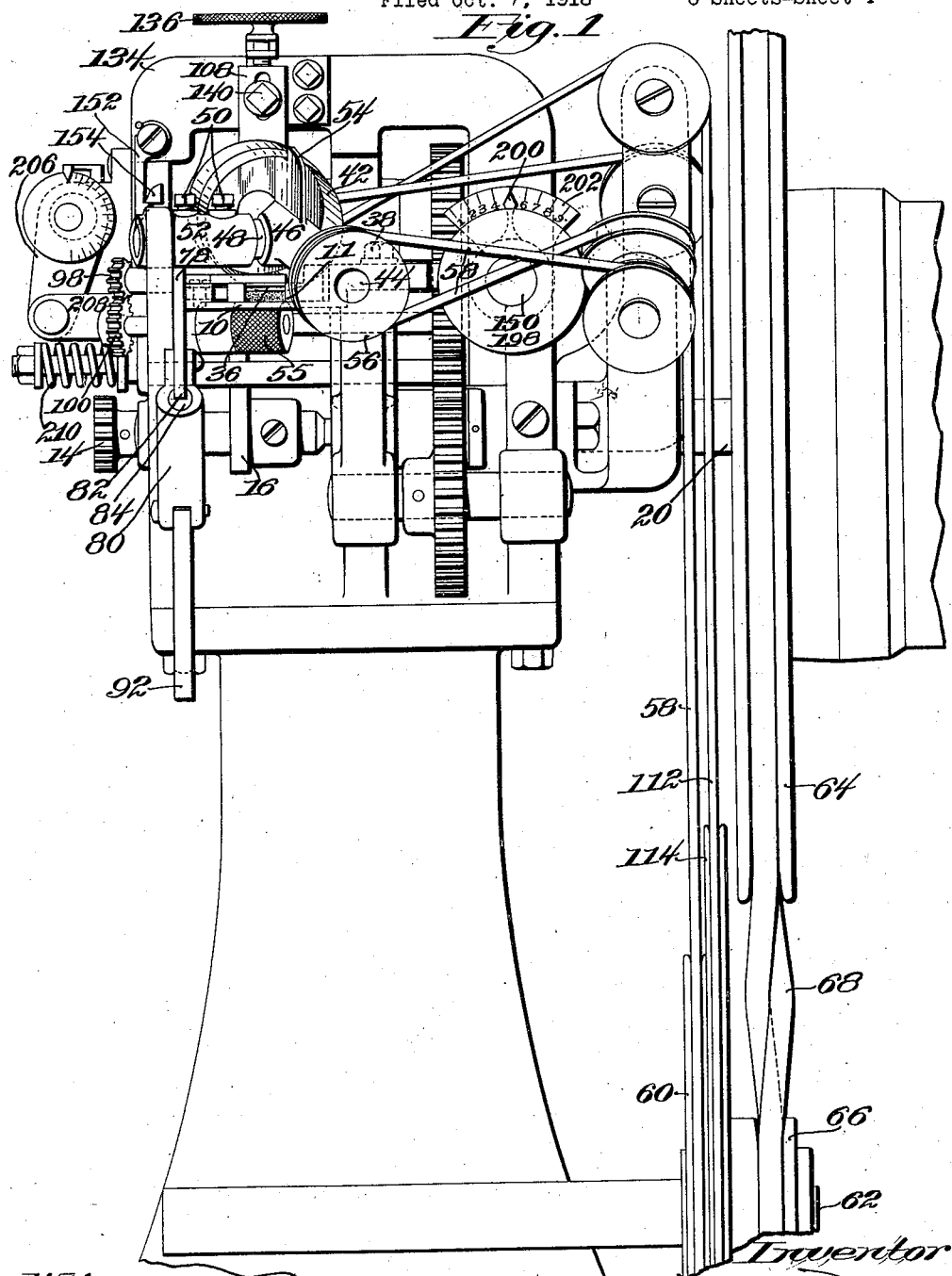

April 1, 1924.
J. A. BROGAN
1,488,470
WELT GROOVING AND BEVELING MACHINE
Filed Oct. 7, 1918
6 Sheets-Sheet 1

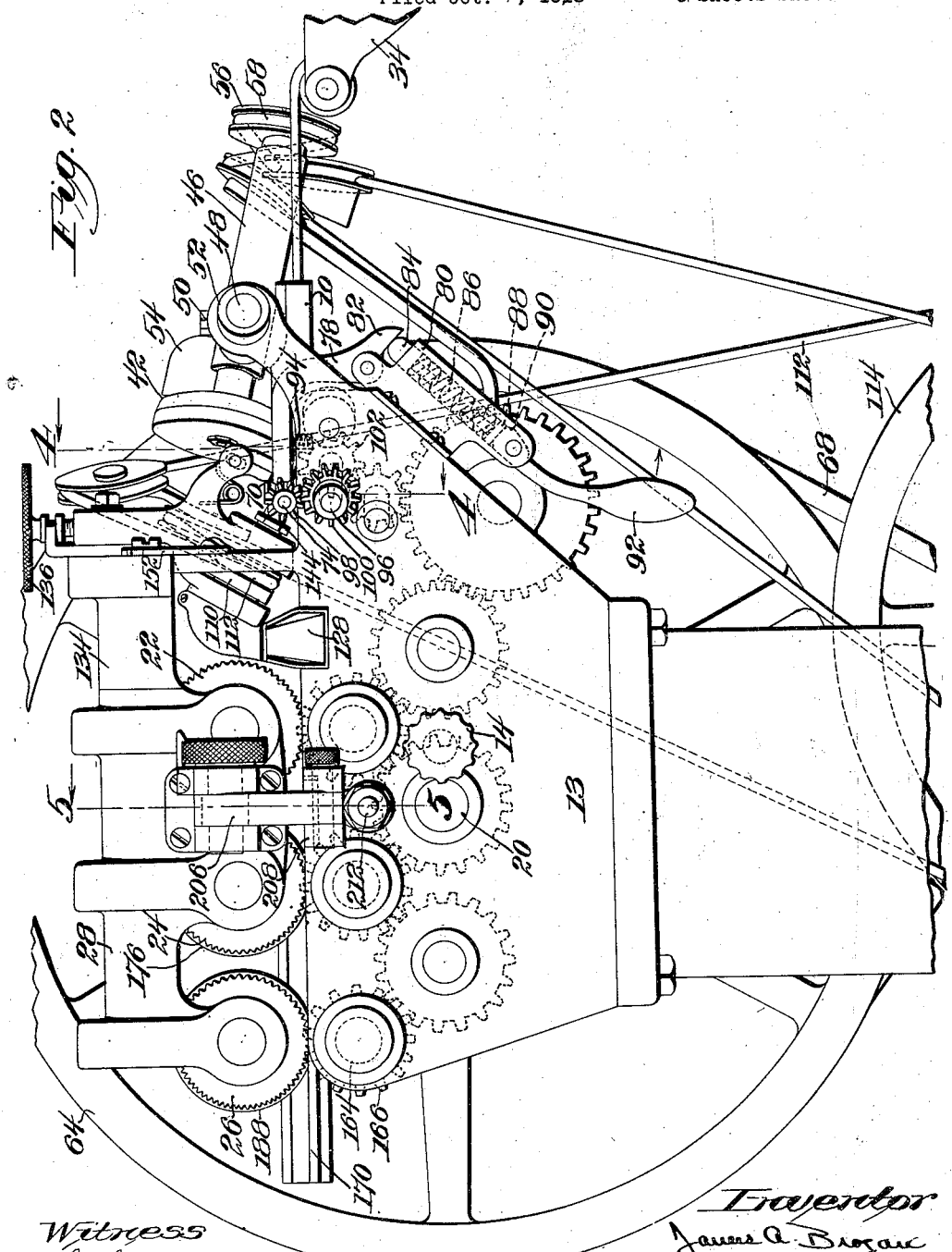

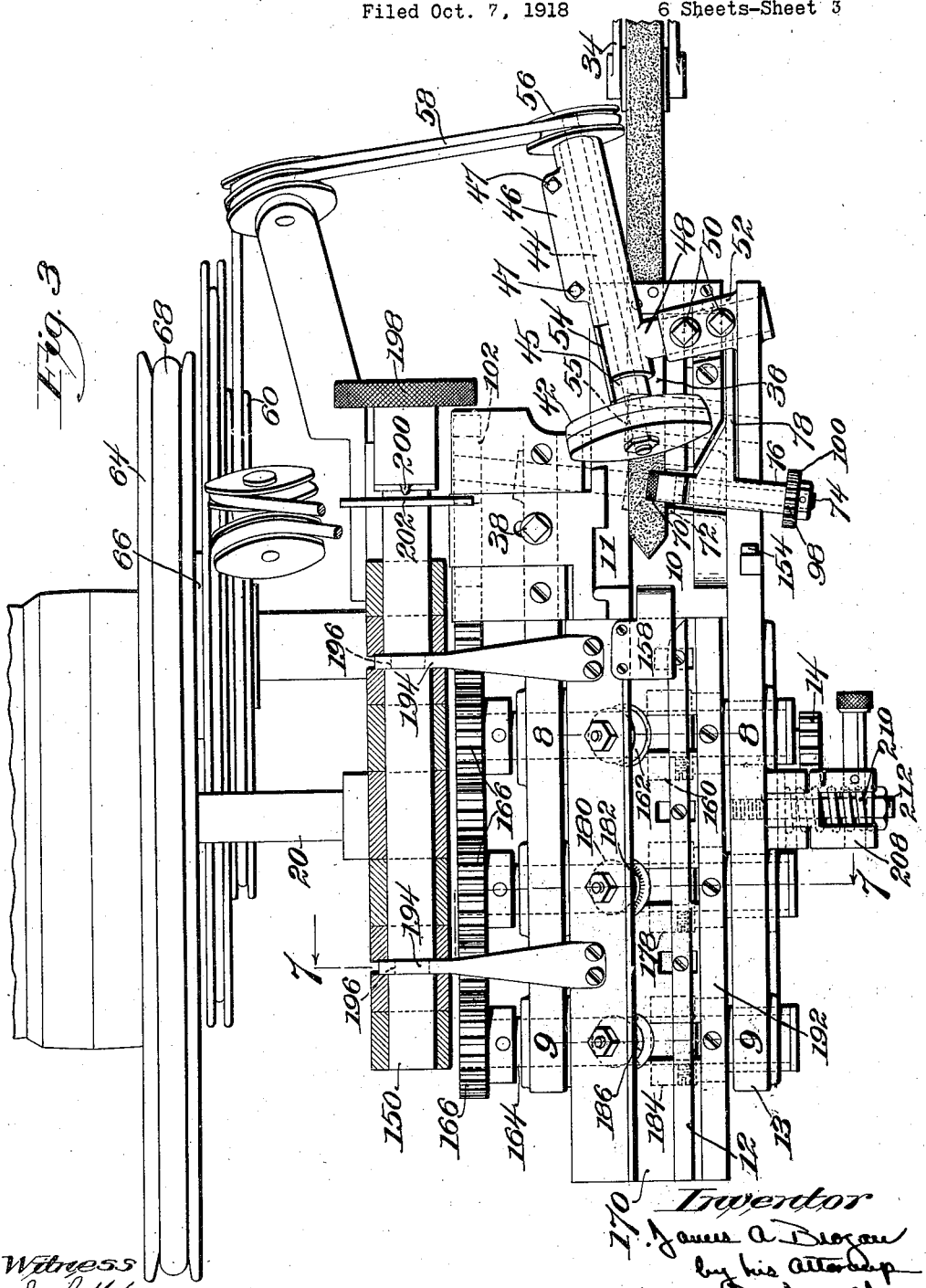

April 1, 1924.                                           1,488,470
               J. A. BROGAN
          WELT GROOVING AND BEVELING MACHINE
             Filed Oct. 7, 1918      6 Sheets-Sheet 4
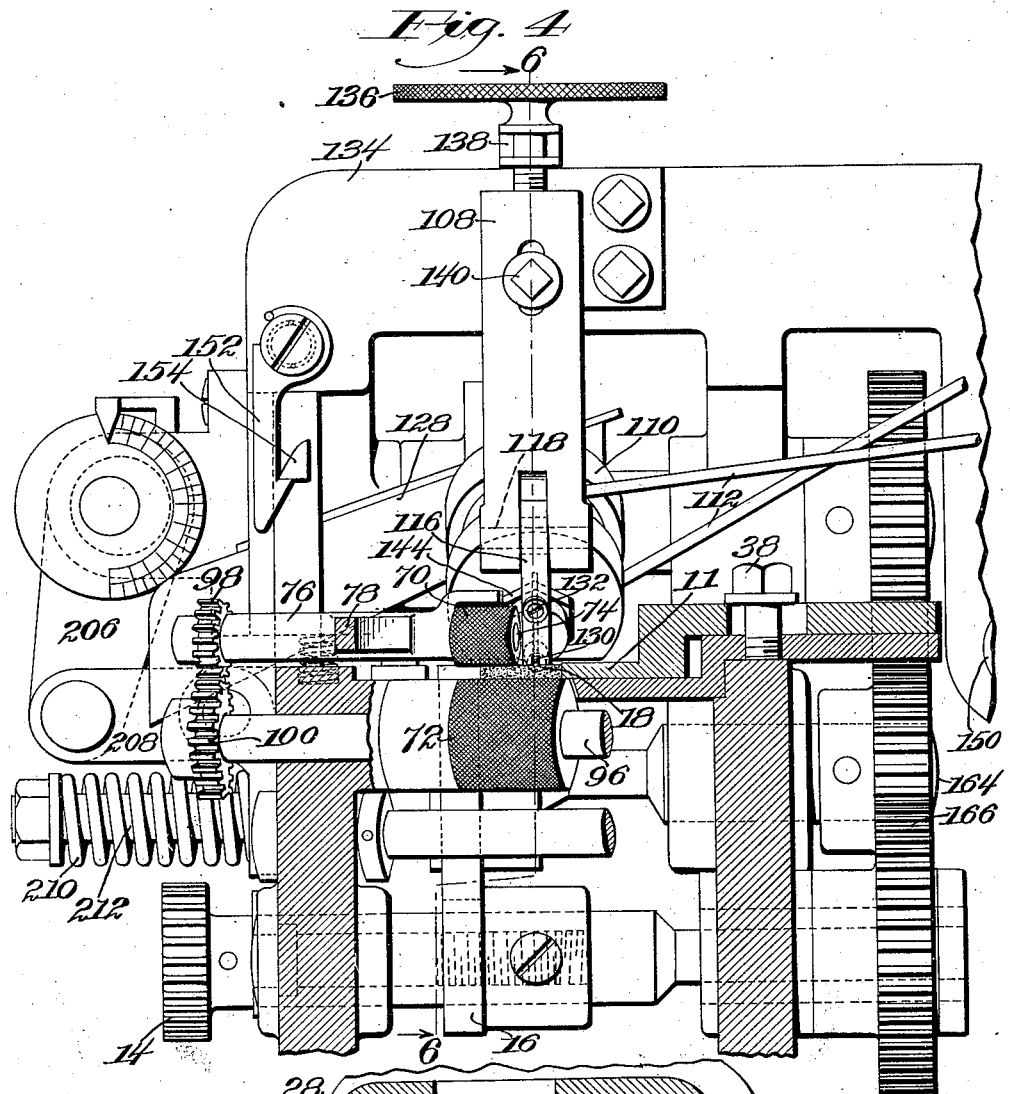
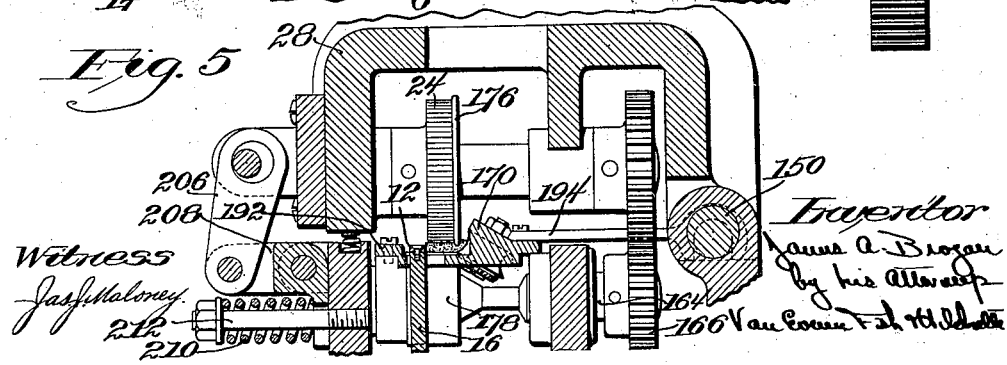

April 1, 1924.
J. A. BROGAN
1,488,470
WELT GROOVING AND BEVELING MACHINE
Filed Oct. 7, 1918
6 Sheets-Sheet 5
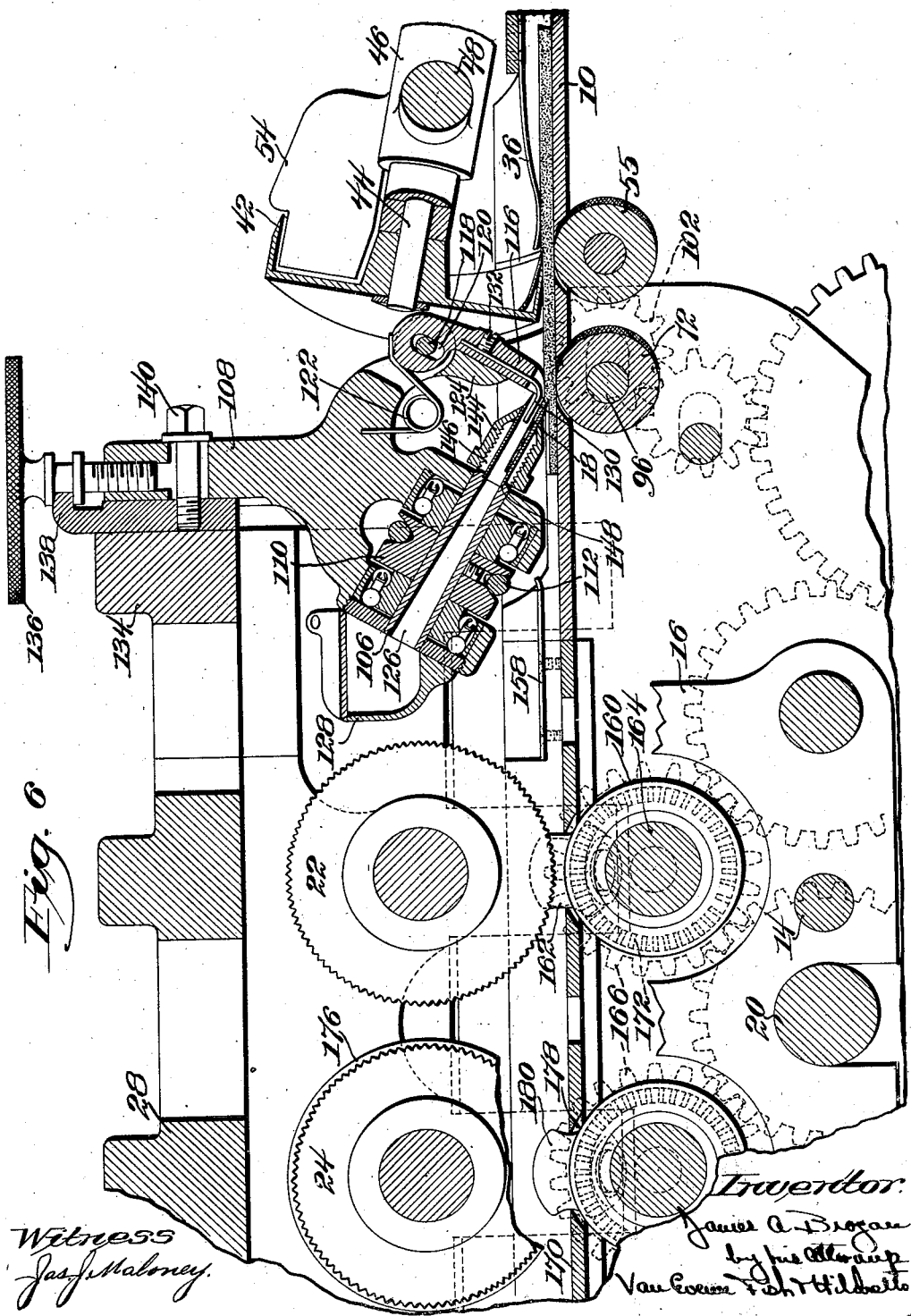

April 1, 1924.

J. A. BROGAN 1,488,470

WELT GROOVING AND BEVELING MACHINE

Filed Oct. 7, 1918   6 Sheets-Sheet 6

Witness
Jas. J. Maloney

Inventor
James A. Brogan
by his attorneys
Van Everen Fish & Hildreth

Patented Apr. 1, 1924.

1,488,470

UNITED STATES PATENT OFFICE.

JAMES A. BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY.

WELT GROOVING AND BEVELING MACHINE.

Application filed October 7, 1918. Serial No. 257,095.

*To all whom it may concern:*

Be it known that I, JAMES A. BROGAN, a citizen of the United States, residing at Lawrence, in the county of Essex and State of Massachusetts, have invented certain new and useful Improvements in Welt Grooving and Beveling Machines; and I do hereby declare the following to be a full, clear, and exact description of the invention, such as will enable others skilled in the art to which it appertains to make and use the same.

The present invention relates to machines for preparing welting, and more particularly to welt grooving and beveling machines for preparing welting for use in the manufacture of Goodyear welt shoes.

Machines of this type are usually provided with a grooving knife to act on the flesh side of the welting strip to form a groove for the reception of the inseam stitches as the welting strip is fed through the machine. With the grooving knives heretofore used, however, considerable difficulty has been experienced in properly feeding the welting strip with sufficient pressure against the cutting edge of the knife to cause the knife to act efficiently without danger of breaking or otherwise injuring the welting strip.

Accordingly, one object of the present invention is to provide an improved grooving knife adapted to freely cut a uniformly smooth groove in a piece of leather or other stock, illustrated as a welting strip, fed with little or no appreciable amount of pressure against the cutting edge of the knife. In the illustrated embodiment of the invention this decrease in pressure is achieved by substituting a moving or "live" knife, shown as a rotating tubular knife, for the usual drag knife for removing a section of material to form a groove. A yielding presser foot holds the stock flat while it is being grooved, and a novel guide is provided to deflect the string of waste through the bore of the tubular knife.

In another aspect the invention contemplates improved means for skiving the stock to a uniform thickness, more especially along the edge to be grooved, and preferably by a "live" or moving knife, as distinguished from a "dead" or drag knife. The feed of the stock is arranged so that the cutting action of the knife tends to crowd the stock against an edge gage; moreover the engagement of the stock with the edge gage is insured by a novel mounting for a pair of feed rolls, so that they rotate in planes inclined to the direction of feed and co-operate with the knife in crowding the stock against the gage.

A further feature of the invention is to be found in improved means to bend or mold on a bevel the edge of the stock which engages the upper in the shoe, the said means comprising rolls rotating about angularly-related axes at peripheral speeds which may be substantially equal if no rubbing effect is desired. In the illustrated embodiment of the invention, the grooved stock projects beyond the ends of co-operating feed rolls, and is bent over and rolled against the side of one of the feed rolls, about the groove as an axis, by means of a third or molding roll.

Further objects are to provide ready access to the operating parts of the machine and an improved yielding mounting for the tools, and with these and other objects in view the present invention consists of certain novel constructions, combinations and arrangements of parts hereinafter described and claimed, the advantages of which will be apparent to those skilled in the art from the following description.

Figure 7:
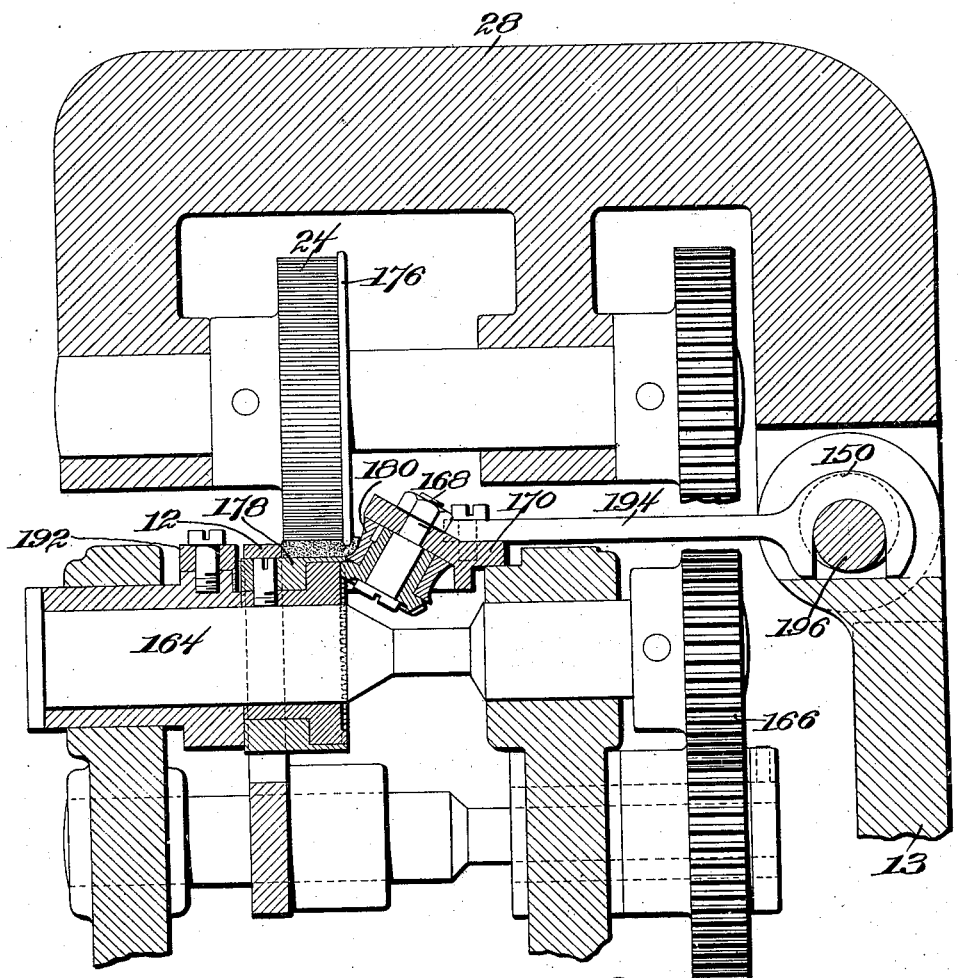
Figure 8:
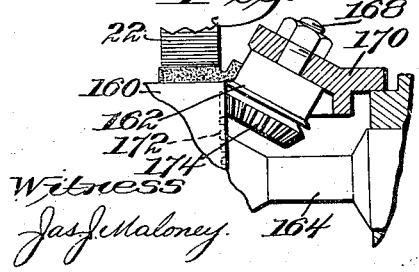
Figure 9:
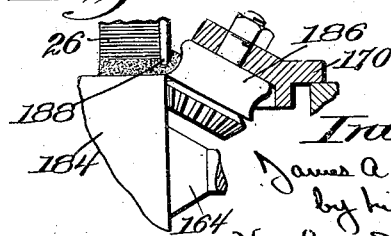

The several features of the present invention will be clearly understood from an inspection of the accompanying drawings, in which Figure 1 is a view in front elevation of a welt grooving and beveling machine embodying the preferred form of my invention; Fig. 2 is a side elevation of the machine; Fig. 3 is a plan view, partly in section, of the machine showing the welt guides, feed rolls and skiving knife, with the grooving knife and upper feeding and molding rolls removed; Fig. 4 is an enlarged sectional view taken substantially on the line 4—4 of Fig. 2; Fig. 5 is a sectional view taken on the line 5—5 of Fig. 2; Fig. 6 is a sectional view taken on the line 6—6 of Fig. 4; Fig. 7 is an enlarged sectional view taken on the line 7—7 of Fig. 3; Figs. 8 and 9 are sectional views respectively taken on the lines 8—8 and 9—9 of Fig. 3.

The machine illustrated in the drawings has the same general construction and mode of operation as the machine illustrated and described in the patent to applicant No. 1,249,590, dated December 11, 1917. This machine is provided with a bottom guide 10, an inner edge guide 11 (Fig. 3), and an outer edge guide 12 mounted on the machine head 13 to assist in guiding the welting strip through the machine. The outer edge guide 12 is laterally adjustable by means of an adjusting screw 14 threaded into a block 16 which carries the outer edge guide. The machine is further provided with a novel grooving knife 18 (Figs. 1, 2 and 6) and three sets of improved welt feeding and molding rolls which are driven through suitable gearing from the main driving shaft 20.

To give access to the feeding and molding rolls, the upper rolls 22, 24 and 26 thereof are mounted on a pivoted portion 28 of the machine head 13 (Fig. 7), which portion 28 is adapted to be swung upwardly on its pivot away from the welt guides but during the normal operation of the machine the pivoted portion 28 is positioned relatively to the lower or main portion of the machine head.

Most of the parts above referred to are substantially the same, except as hereinafter described, as the corresponding parts of the machine disclosed in said patent, to which reference is hereby made for a more detailed description of these parts.

In the machine illustrated in the drawings, after the welting strip leaves its container or holder 34 (Fig. 2) it passes between the bottom guide 10 and an upper guide or presser foot 36 (Fig. 6) and is sustained against the inner edge guide 11. The presser foot 36 consists of a yielding plate which firmly engages the flesh side of the welting strip. The inner edge guide 11 is mounted upon the bottom guide 10 and is adapted to be adjusted transversely of the bottom guide by means of a bolt 38 which extends through a slot in the inner edge guide and is threaded into the machine frame.

The present machine has provision for skiving the inner portion of the flesh side of the welting strip to a uniform thickness throughout its length so that the groove formed by the grooving knife will be of a uniform depth and the material at the bottom of the groove through which the inseam stitches pass will be of a uniform thickness. Such skiving of the welting strip is particularly desirable in case the welting is of considerable thickness, as the resulting reduction of the inner edge of the welting strip causes it to be more efficiently acted upon by the molding rolls and also better adapts the edge for attachment to the upper and insole of a shoe. This skiving operation which occurs preliminary to the grooving and beveling operations is effected by means of a rotary cylindrical skiving knife 42 (Figs. 1, 2 and 3) having its circular cutting edge located adjacent the rear end of the presser foot 36. The skiving knife is carried by the rear end of a shaft 44 which extends through a bearing 45 held in a split clamping sleeve 46 by screws 47 which tend to clamp the sleeve to the bearing. The skiving knife is adapted to be adjusted longitudinally of the welting strip by loosening the screws 47. The clamp 46 is supported by a cylindrical shank 48 formed thereon which is secured by set screws 50 in a bracket 52 on the frame of the machine. The skiving knife may be adjusted transversely of the welting strip or swung out of operative position by loosening the set screws 50. The skiving knife is provided with a guard 54 secured to the bearing 45 which serves to guide the skivings away from the cutting edge of the knife. By positioning the skiving knife so as to bring its axis at an acute angle to the direction of feed of the welting strip, as shown in the drawings, the rotation of the knife will tend to hold the welting strip against the inner edge guide. The welting strip is sustained against the cutting edge of the knife by the presser foot 36, and a supporting roll 55 located directly beneath the cutting edge. The skiving knife is rotated through the pulley 56 (Fig. 1) secured to the forward end of its shaft 44 which is connected by a belt 58 with a pulley 60 on a countershaft 62 at the base of the machine. The shaft 62 is connected with a pulley 64 on the main driving shaft 20 through a pulley 66 thereon and a belt 68.

The operation of the skiving knife 42 is such that the operator is enabled to feed the welting strip initially by hand to cause the knife to skive the advanced end of the welting. After the end of the welting strip is thus fed past the skiving knife, it is further fed through the machine by two feed rolls 70 and 72 having knurled surfaces which respectively engage the top and bottom faces of the welting strip. To assist in the initial engagement of the end of the welting strip and the feed rolls 70 and 72, the latter are adapted to be separated to permit the end of the welting strip to be readily inserted between them and adapted to be then brought into operative engagement with the welting strip. To this end the upper feed roll 70 is secured to the inner end of a shaft 74 which extends through a bearing 76 on the rear end of a lever 78. The lever 78 is pivoted on a bracket 80 mounted on the frame of the machine and its arm 82 is engaged by a plunger 84 mounted to slide in an aperture in the bracket 80. The plunger 84 is pressed outwardly against the arm 82 by a spring 86 disposed between the lower end of the plunger and a disk 88 mounted in the aperture in the bracket which engages a cam surface 90 on a hand lever 92 pivoted on the bracket 80. By swinging the hand lever 92 in the direction of the arrow (Fig. 2) the pressure of the plunger on the arm 82 of the lever 78 is relieved, thereby permitting a spring 94 beneath the upper arm of the lever 78 to raise the feed roll 70 away from the lower feed roll. The feed rolls 70 and 72 may then be brought into operative engagement by returning the hand lever 92 to the position shown in Fig. 2. The lower feed roll 72 is secured to a shaft 96 journaled in the frame of the machine and is operatively connected to the feed roll 70 by intermeshing gears 98 and 100 respectively secured to the outer ends of the shafts 74 and 96. The feed rolls are driven through a gear 102 (Fig. 2) on the further end of the shaft 96 which is connected through a chain of gears with the main driving shaft 20 of the machine. The feed rolls 70 and 72 are arranged diagonally of the welting strip (Fig. 3) to assist the skiving knife 42 in holding the strip against the inner edge guide 11.

The feed roll 70 extends only partially across the welting strip to permit the cutting edge of the grooving knife 18 to be located adjacent the inner end of the feed roll. In the illustrated machine the grooving knife is mounted for rotation at a relatively high speed to freely cut a uniformly smooth groove of substantially cylindrical shape in the skived portion of the welting strip. The grooving knife 18 consists of a tube having a circular cutting edge, and is arranged with its axis at an acute angle and in a plane parallel to the direction of the line of feed of the welting strip. The grooving knife is carried by a mandrel 106 mounted in ball bearings in a bracket 108 and driven by a pulley 110 thereon which is connected by a belt 112 with a relatively large pulley 114 on the counter shaft 62 of the machine.

The welting strip is engaged immediately in advance of the cutting edge of the grooving knife by a spring actuated presser foot 116 (Fig. 6) which cooperates with the feed roll 72 in properly presenting the welting strip to the grooving knife. The presser foot 116 is mounted on the bracket 108 by means of a guide pin 118 extending through a slot 120 in the presser foot which is shaped to permit a slight movement of the presser foot toward and from the welting strip. The presser foot is pressed downwardly toward the welting strip and rearwardly toward the cutting edge of the grooving knife by a spring 122 having one end attached to the bracket and the other end in engagement with the upper end of the presser foot. The presser foot is prevented from being swung into engagement with the cutting edge of the grooving knife by the shoulder 124 on the bracket 108.

The material cut from the welting strip to form the groove passes through the grooving knife, through an axial bore 126 in the mandrel 106 and out of the machine through a chute 128 into which the bore 126 opens. To prevent pieces of material cut from the welting strip from clogging the passage through the grooving knife, a guide rod 130 is inserted a sufficient distance into the lower end of the knife to cause the material to be guided directly but spirally through the passage. The guide rod 130 is secured to the presser foot 116 and is made adjustable by means of a set screw 132, to accommodate the rod to different thicknesses of material removed from the welting strip by the grooving knife.

The grooving knife may be moved toward and from the welting strip to vary the depth of the cut or to move the grooving knife into and out of operative position, by vertically adjusting the hanger 108 which is mounted on a pivoted portion or beam 134 on the head of the machine. The hanger 108 is made adjustable on the beam 134 by means of a hand screw 136 screwed into an aperture in the hanger and having a reduced portion of its head engaged by a yoke 138 secured to the beam. The hanger 108 is firmly retained in its adjusted position by tightening a bolt 140 threaded into the beam 134 and extending through a slot in the hanger.

To give access to the grooving knife 18 and the presser foot 116, the beam 134 is adapted to be swung to position the grooving knife and presser foot away from the welting strip. When the grooving knife is thus positioned away from the welting strip, it may be easily removed from the mandrel 106 by first loosening a cap 144 threaded onto the split end 146 of the mandrel which, when the cap is tightened, firmly grips the shank of the grooving knife and holds the end of the shank against a shoulder 148 on the mandrel. The beam 134 is pivoted on a shaft 150 supported in bearings on the head of the machine, and during the normal operation of the machine is held down by a spring actuated latch 152 (Figs. 1 and 2) which engages a lug 154 on the frame of the machine.

After being acted upon by the grooving knife, the advancing end of the welting strip passes under the guide plate 158 which prevents said end from appreciably curling upwardly during its passage to the upper feed roll 22. The roll 22 has a milled or corrugated surface that engages the welting strip adjacent the outer edge of the groove and firmly presses the welting down onto molding rolls located directly below the feed roll which effect the first step in the molding of the bevel on the grain side of the welting strip, as presently described.

In the machine illustrated and described in Patent No. 1,249,590 hereinbefore referred to, the lower molding rolls are provided with peripheral grooves, the groove on the last roll being of the shape desired to mold the bevel on the welting strip, and the welting strip is worked into these grooves by peripheral ribs on the upper feeding and molding rolls which engage the groove in the welting strip. It has been found that in this construction of the lower molding rolls different points in the periphery of the individual rolls tend to feed the contacting portion of the welting strip at different speeds which materially impairs the proper molding of the bevel on the welting strip, and tends to work the welting strip out of proper position on the molding rolls.

To overcome this difficulty in the prior machine, each of the three sets of molding rolls in the present machine are furnished with two rolls which engage the grain side of the welting strip and are constructed and arranged in such a manner that the rolls travel at substantially the same surface speed throughout their combined welt engaging area. This is effected by having one of the rolls of each set of molding rolls constructed and arranged at the proper angle to engage and mold the desired bevel on the inner edge of the welting strip while the other roll is constructed and arranged to engage the remaining portion of the grain side of the welting strip, and the two rolls are provided with intermeshing gear teeth positioned to drive the rolls at the same surface speed. In Fig. 8 of the drawings the roll which engages the welting strip to the left or outside of its groove is shown at 160 and the roll arranged at an angle to engage the inner edge portion of the welting strip is shown at 162. The roll 160 is carried on a shaft 164 driven by a gear 166 on the inner end thereof meshing with a gear fixed to the main driving shaft 20 on the machine. The roll 162 is journaled on a stud 168 fixed to the bar 170, and is rotated at the same surface speed as the roll 160 by means of intermeshing gear teeth 172 and 174 respectively located on the rolls close to their peripheries. The passage of the welting strip between the feed roll 22 and these molding rolls 160 and 162 bends and molds the inner edge of the welting substantially as illustrated in Fig. 8. The roll 24 of the second set of molding rolls is provided with a peripheral rib 176 which fits into the groove in the welting strip, and the portion of the welting outside of the roll is firmly engaged between the knurled portion of the roll 24 and a roll 178 which corresponds to said roll 160. This permits a roll 180, arranged at the proper angle to the roll 178, to bend and mold the welting about the rib 176 as shown in Fig. 7. The roll 180 is similar in construction and arrangement to the roll 162 of the first set of molding rolls but its periphery is slightly different in shape and is provided with a corrugated surface portion 182 (Fig. 3) which materially assists in shaping the welting about the rib 176. The third and final set of feeding and molding rolls is provided with a horizontal roll 184 and an edge engaging roll 186 which are respectively similar to the rolls 178 and 180, and are arranged to still further mold the edge of the welting strip about a peripheral rib 188 on the upper feeding and molding roll 26 which completes the formation of the desired bevel on the welting strip (Fig. 9).

The lower horizontal rolls 178 and 184 of the second and third sets of molding rolls are secured to shafts 164—164 which correspond to shaft 164 on which the lower horizontal roll 160 is mounted, and are driven by gears 166 on their inner ends connected to the main driving shaft 20 of the machine through suitable gears. The shafts 164 are adapted to slide longitudinally through and are journaled in suitable bearings in the machine frame (Fig. 7), and their outer portions are journaled in bearings secured to a carrier 192. The bar 170 upon which the roll 162 of the first set of molding rolls is mounted as hereinbefore described, forms a component part of the carrier 192. The molding rolls 180 and 186 are also mounted on the bar 170 in a similar manner.

In order to vary the molding action of the three sets of molding rolls and to adjust them to accommodate welting strips having their edges which are to be molded of different thicknesses, the lower molding rolls are adapted to be horizontally adjusted relatively to the upper rolls, and means are provided on the machine to accurately indicate to the operator the relatively horizontal positions of the upper and lower molding rolls. To effect such adjustment of the lower molding rolls, said carrier 192 upon which these rolls are carried, is mounted to be moved transversely of the head of the machine by means of horizontal arms 194—194 secured to said carrier and having their ends forked to engage reduced eccentric portions 196 of the shaft 150 hereinbefore referred to. The shaft 150 is adapted to be rotated to shift the carrier 192 by means of a hand wheel 198 secured to the forward end of the shaft, and the position of the carrier and hence the position of the lower molding rolls relatively to the upper molding rolls is accurately indicated to the operator by means of a pointer 200 secured to the shaft 150 which is arranged to move over a suitable dial 202 mounted on the frame of the machine.

In the machine which forms the subject matter of said prior patent, the pivoted portion of the head of the machine on which the upper feeding and molding rolls are mounted, is rigidly held down by means of a link, corresponding to a link 206 (Fig. 5) of the present machine, which connects the pivoted portion with the stationary frame of the head of the machine. Such mounting of the upper feeding and molding rolls, however, does not permit the molding rolls to efficiently act on a welting strip varying considerably in thickness. To accommodate the present machine to a welting strip varying considerably in thickness, the lower end of said link 206 is connected to one arm of an elbow lever 208 pivoted on the frame of the machine and having its other arm yieldingly pressed against the frame by an expansion spring 210 mounted on a bolt 212 secured to the frame, which permits the upper feed rolls to yieldingly adjust themselves to the variations in the thickness of the welting strip.

While the features described above are well adapted for use in the type of machine illustrated in the drawings, it is to be understood that except as defined in the claims certain features of the invention are not limited to use in a machine embodying any or all of the other features.

The nature and scope of the invention having been indicated, and a machine embodying the several features of the invention in their preferred form having been specifically described, what is claimed is:—

1. A machine for preparing welting having, in combination, means for supporting a welting strip, a tubular knife having a substantially circular cutting edge, and means for rotating the knife to form a groove in the welting strip of substantially the same diameter as the cutting edge of the knife.

2. A machine for preparing welting having, in combination, means for supporting a welting strip, a tubular knife having a substantially circular cutting edge and having its axis arranged at an angle to the welting strip, and means for rotating the knife to form a groove in the welting strip.

3. A machine for preparing welting having, in combination, means for supporting a welting strip, a tubular knife having a substantially circular cutting edge, means for rotating the knife to cut a groove in the welting strip, and a guide extending into the bore of the knife to guide the material cut from the welting strip therethrough.

4. A machine for preparing welting having, in combination, means for supporting a welting strip, a tubular knife having a substantially circular cutting edge, a presser foot arranged adjacent the cutting edge of the knife to yieldingly engage the welting strip, and means for rotating the knife to cut a groove in the welting strip.

5. A machine for preparing welting having, in combination, means for supporting a welting strip, a tubular knife having a substantially circular cutting edge, a presser foot positioned on the same side of the welting strip as the knife, and a work supporting roll positioned to present the welting strip to the cutting edge of the knife, and means for rotating the knife to form a groove in the welting strip.

6. A machine for preparing welting having, in combination, means for supporting a welting strip, means for skiving the welting strip adjacent one edge to a uniform lengthwise thickness while leaving the other edge of the welting strip substantially intact, and means for forming a groove in the skived portion of the welting strip.

7. A welt grooving and beveling machine having, in combination, means for supporting a welting strip, means for skiving the flesh side of the welting strip to reduce the thickness of one edge while leaving the other edge of the welting strip substantially intact, means for forming a groove in the flesh side of the welting strip adjacent said edge, and means for beveling said edge on the grain side of the welting strip.

8. A machine for preparing welting having, in combination, means for supporting a welting strip, and a rotative cylindrical knife having its axis positioned diagonally across the welting strip and having a substantially circular cutting edge to skive the welting strip on its flesh side adjacent one edge preliminary to the grooving and beveling operations.

9. A machine for preparing welting having, in combination, means for supporting a welting strip, an edge guide for the welting strip, and a rotative cylindrical skiving knife to act on the welting strip and having its axis positioned diagonally across the welting strip to hold it against the edge guide.

10. A machine for preparing welting having, in combination, a support for a welting strip, an edge guide for the welting strip, and means including a cylindrical roll having its axis arranged diagonally across the welting strip to feed the welting strip and hold it against the edge guide.

11. A machine for preparing welting having, in combination, means for supporting a welting strip, and means including two rolls having their axes positioned at an angle to each other to mold a bevel on the grain side of the welting strip.

12. A machine for preparing welting having, in combination, means for supporting a welting strip, two molding rolls having their axes arranged at an angle to each other to engage the grain side of the welting strip, and means for rotating the rolls at substantially the same surface speeds to mold a bevel on one edge of the welting strip.

13. A machine for preparing welting having, in combination, a roll for engagement with a side of a welting strip, and a roll having its axis at an angle to the first roll to mold a bevel on an edge of the welting strip.

14. A machine for preparing welting having, in combination, a feed roll to engage a side of a welting strip, and a molding roll to engage an edge of the welting strip and having its axis at an angle to the axis of the feed roll, and means for rotating the rolls at substantially the same surface speeds to bevel said edge of the welting strip.

15. A machine for preparing welting having, in combination, means for supporting a welting strip having a groove adjacent an edge thereof, a roll having a peripheral rib to engage the groove in the welting strip, and a molding roll having its axis at an angle to the axis of the first roll to mold said edge of the welting strip about the rib.

16. A machine for preparing welting having, in combination, means for supporting a welting strip having a groove on its flesh side adjacent one edge, a roll having a peripheral rib to engage the groove in the welting strip, two molding rolls having their axes at an angle to each other to engage the grain side of the welting strip to mold said edge about the rib, and means for shifting the two molding rolls transversely of the welting strip.

17. A machine for operating on leather or similar material having, in combination, means for supporting the material, a knife having a substantially circular cutting edge, and means for rotating the knife about an axis transverse to the plane of the cutting edge of the knife to form a groove in the material of substantially the same diameter as the cutting edge of the knife.

18. A machine for operating on leather or similar material having, in combination, means for supporting the material, a tubular knife having a substantially circular cutting edge, means for rotating the knife to cut a groove in the material, and a guide extending into the bore of the knife to guide the portions cut from the material through the knife.

19. A machine for preparing welting having, in combination, means for supporting a welting strip, a rotary cylindrical knife for skiving the welting strip adjacent one edge to a uniform lengthwise thickness, and means for forming a groove in the skived portion of the welting strip.

20. A machine for preparing welting having, in combination, means for supporting a welt used in Goodyear welt shoes, and means comprising a knife rotating about an axis extending longitudinally of the welt for cutting a groove therein for the reception of the inseam stitches while the portion of the welt being grooved is held substantially flat.

21. A machine for preparing welting having, in combination, a support for a welting strip, an edge guide for the welting strip, and means including a pair of rolls engaging opposite sides of the welting strip and having their axes arranged diagonally across the welting strip to feed the strip and hold it against the edge guide.

22. A machine for preparing welting having, in combination, a support for a welting strip, a knife having an axial bore and a circular cutting edge constructed to cut a groove in the welting strip and to guide the waste strip through said axial bore, and a guide to direct the waste strip into the axial bore.

23. A machine of the class described comprising, in combination, a support for a piece of stock, and a tubular knife of small diameter rotating about its axis and mounted to project below the surface of the stock and cut a groove therein of a width approximating the diameter of the knife.

24. A machine of the class described comprising, in combination, means to feed a piece of stock, and a tubular knife rotating about its axis and arranged with its axis inclined to meet the stock in a vertical plane substantially parallel to the direction of feed, said knife being constructed and arranged to guide the waste axially out through the end opposite the cutting edge.

25. A machine of the class described comprising, in combination, means to feed a piece of stock, an edge gage for stock fed thereby, and a rotary knife rotating about an axis inclined at an acute horizontal angle to the direction of feed to crowd the stock against the edge gage.

26. A machine of the class described comprising, in combination, a tool to act on a piece of stock, an edge gage to determine the position of the stock relatively to the tool, and a cylindrical feed wheel rotating about an axis arranged diagonally across the stock to crowd the stock against the edge gage.

27. A machine of the class described comprising, in combination, a tubular knife, means to rotate the knife about its longitudinal axis, and a pivotally-mounted head for the knife, and means to rock the head on its pivot to carry the knife to and from operative position.

28. A machine of the class described comprising, in combination, rolls to feed a piece of stock with a portion projecting at one side, and means to bend the portion of the stock which projects beyond the rolls, said means comprising a plurality of members constructed and arranged to perform the bending operation in successive stages.

29. A machine for preparing welting comprising, in combination, a roll to support a strip of welting, a narrower roll to engage one side of a strip supported thereby, gearing to rotate the rolls to feed the strip, and a moving groover knife mounted to engage the strip beside the narrower roll and cut against the support of said first roll.

30. A machine for preparing welting for shoes comprising, in combination, means for feeding a strip of welting holding it flat transversely, and a power-driven moving knife to remove a section of waste to form a groove in welting fed thereby for the reception of the inseam stitches of the shoe, and means to form a bevel along one edge of the welting as it is grooved thereby.

JAMES A. BROGAN.